(12) United States Patent
Chu

(10) Patent No.: US 9,156,177 B2
(45) Date of Patent: Oct. 13, 2015

(54) DEVICE FOR DISASSEMBLING LENS MODULE

(71) Applicant: HON HAI PRECISION INDUSTRY CO., LTD., New Taipei (TW)

(72) Inventor: Chih-Hao Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 13/971,864

(22) Filed: Aug. 21, 2013

(65) Prior Publication Data

US 2014/0311313 A1    Oct. 23, 2014

(30) Foreign Application Priority Data

Apr. 23, 2013    (TW) .............................. 102114490 U

(51) Int. Cl.
| | |
|---|---|
| *B26D 5/08* | (2006.01) |
| *G02B 7/02* | (2006.01) |
| *B26D 7/01* | (2006.01) |
| *B26D 3/16* | (2006.01) |
| *G02B 7/14* | (2006.01) |

(52) U.S. Cl.
CPC *B26D 5/08* (2013.01); *G02B 7/023* (2013.01); *B26D 3/16* (2013.01); *B26D 7/01* (2013.01); *G02B 7/14* (2013.01); *Y10T 82/16229* (2015.01); *Y10T 82/16573* (2015.01); *Y10T 82/16967* (2015.01); *Y10T 83/8821* (2015.04)

(58) Field of Classification Search
CPC .............. B26D 5/00; B26D 5/02; B26D 5/08; B26D 3/06; B26D 3/08; B26D 3/11; B26D 3/16; B26D 3/166; B26D 7/01; Y10T 82/16573; Y10T 82/16819; Y10T 82/16; Y10T 82/16229; Y10T 82/16409; Y10T 82/16967; Y10T 83/8821; Y10T 83/8841; Y10T 83/8847; Y10T 83/8848; Y10T 83/8854; Y10T 83/9459; Y10T 83/6667; Y10T 83/687; Y10T 83/695
USPC .............. 83/613, 627, 631, 632, 636, 698.21, 83/733, 746, 762; 82/78, 93, 46, 59, 70, 82/101; 142/56
See application file for complete search history.

(56) References Cited

U.S. PATENT DOCUMENTS

| | | | | |
|---|---|---|---|---|
| 1,838,011 | A * | 12/1931 | St. Peter ......................... | 83/862 |
| 4,075,916 | A * | 2/1978 | Fisher .............................. | 82/78 |
| 4,864,906 | A * | 9/1989 | Hall ................................ | 83/886 |
| 5,383,380 | A * | 1/1995 | Sartori ........................... | 82/70.1 |
| 6,516,694 | B1 * | 2/2003 | Easton et al. ................... | 83/54 |
| 7,640,834 | B2 * | 1/2010 | Morawiec et al. ............... | 82/47 |

* cited by examiner

*Primary Examiner* — Phong Nguyen
(74) *Attorney, Agent, or Firm* — Novak Druce Connolly Bove + Quigg LLP

(57) ABSTRACT

A device includes a bearing assembly, a supporting assembly, a cutting assembly, a rotation pole, and a transmitting assembly. The supporting assembly includes a driving pole rotatably supported on the bearing assembly and a pair of guiding rails positioned on the bearing assembly. The cutting assembly screws on the driving pole and is slidably supported on the guiding rails. The cutting assembly includes a cutter protruding from the top plate. The rotation pole is rotatably positioned on the bearing assembly and is configured for supporting a lens module. The transmitting assembly drives the rotation pole and the driving pole to rotate. The driving pole drives the cutting assembly to move and the rotation pole to rotate, the cutter cuts the lens module during moving along the driving pole.

9 Claims, 2 Drawing Sheets

DEVICE FOR DISASSEMBLING LENS MODULE

BACKGROUND

1. Technical Field

The present disclosure relates to devices, and particularly to a device for disassembling a lens module.

2. Description of Related Art

Lens modules generally include a lens barrel and at least one lens received in the lens barrel. To increase usage efficiency, it is desired that the lens can be detached from the barrel and reused if the lens barrel fails to pass quality tests. However, during the current manual detaching process the lens may be damaged or contaminated.

Therefore, it is desirable to provide a device that can overcome the limitations described.

DETAILED DESCRIPTION

Embodiments of the disclosure will be described with reference to the drawings.

Figure 1:
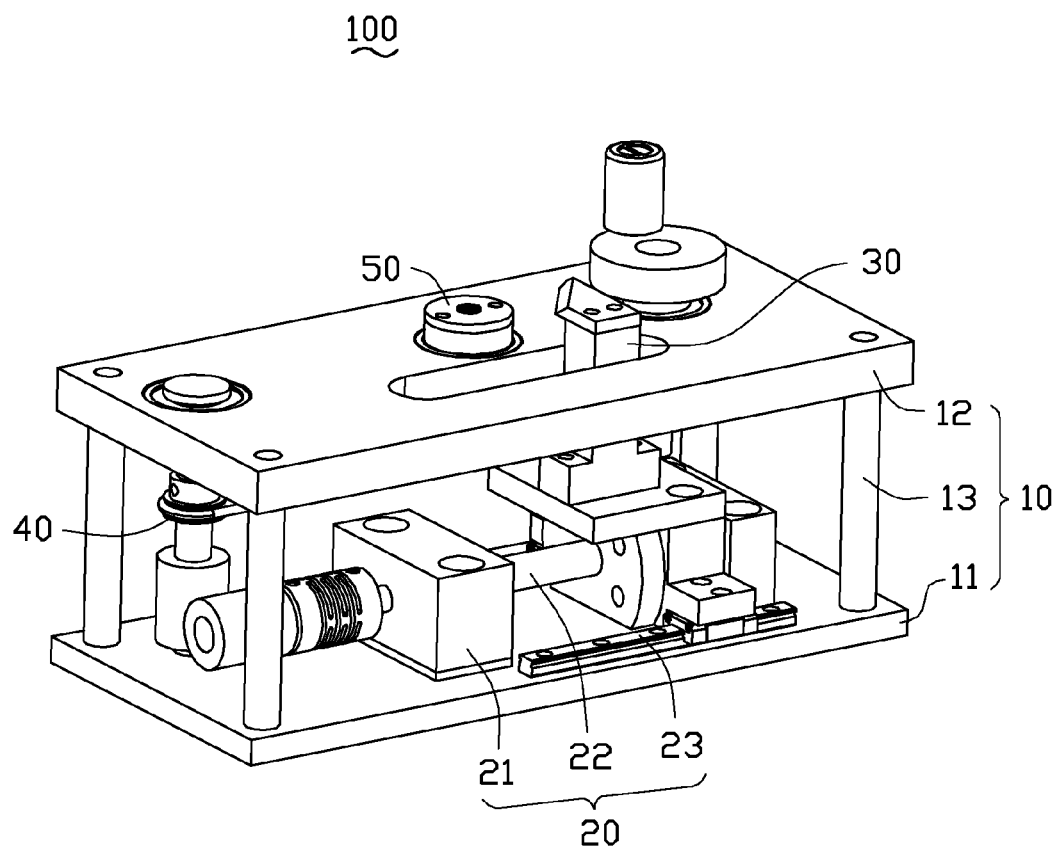
FIG. 1 is an isometric view of a device in accordance with an exemplary embodiment.
Figure 2:
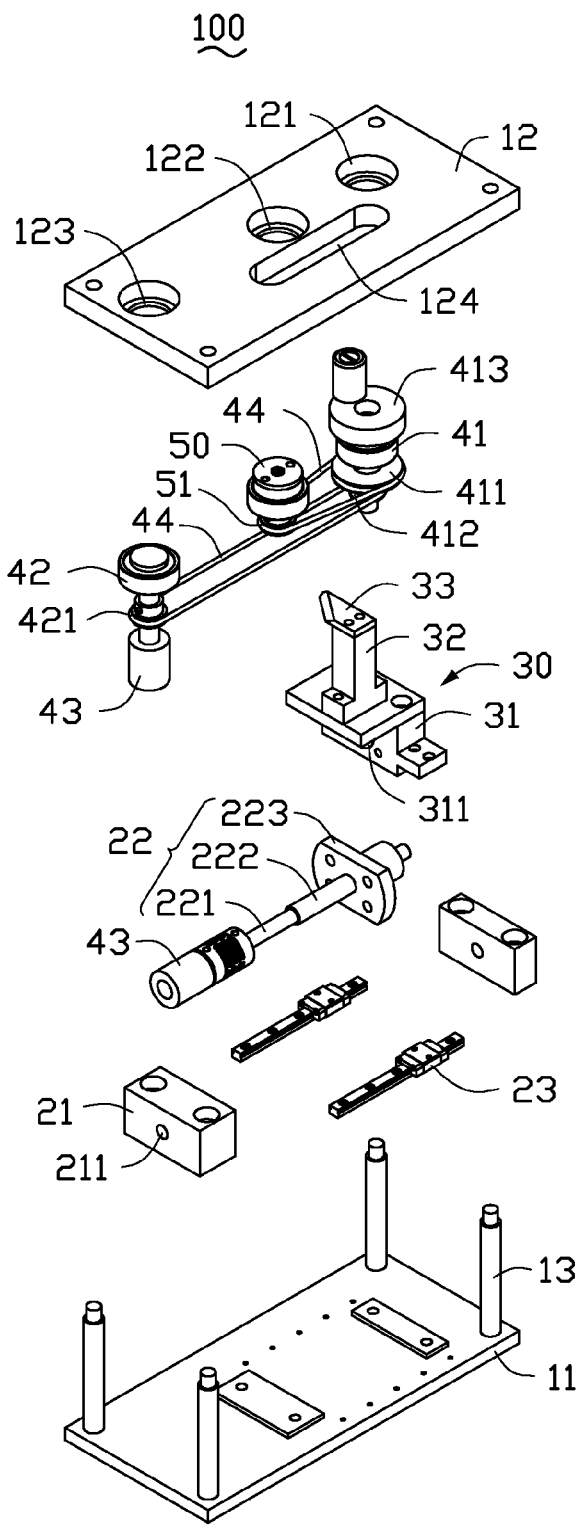
FIG. 2 is an isometric, exploded, and schematic view of the device of FIG. 1.

FIGS. 1-2 show a device 100 for disassembling a lens module, according to an exemplary embodiment. The device 100 includes a bearing assembly 10, a supporting assembly 20, a cutting assembly 30, a transmitting assembly 40, and a rotation pole 50.

The bearing assembly 10 includes a bottom plate 11, a top plate 12, and a number of supporting poles 13 supported between the bottom plate 11 and the top plate 12. The bottom plate 11 is opposite to and parallel with the top plate 12. The bottom plate 11 and the top plate 12 are rectangular shaped. The top plate 12 defines a first shaft hole 121, a second shaft hole 122, a third shaft hole 123, and a slot 124. The first shaft hole 121, the second shaft hole 122, the third shaft hole 123 are arrayed along one line substantially parallel to a long side of the top plate 12. The second shaft hole 122 is positioned between the first shaft hole 121 and the third shaft hole 123. The slot 124 is adjacent to the second shaft hole 122, and an extension direction of the slot 124 is substantially parallel to the long side of the top plate 12.

The supporting assembly 20 includes a pair of supporting seats 21, a driving pole 22, and a pair of guide rails 23. The two supporting seats 21 are separately supported on the bottom plate 11, and each of the supporting seats 21 defines a fourth shaft hole 211. The two fourth shaft holes 211 are aligned with each other, and central axes of the fourth shaft holes 211 are substantially parallel with the extension direction of the slot 124. The driving pole 22 includes a guiding portion 221, a screw portion 222, and a fixing portion 223. The screw portion 222 is sleeved on the guiding portion 221, generally adjacent to a middle of the guiding portion 221. The fixing portion 223 is sleeved on the screw portion 222, generally adjacent to an end of the screw portion 222. The two ends of the guiding portion 221 are received in the fourth shaft holes 211. The two guiding rails 23 are supported substantially parallel on the bottom plate 11, and are positioned between the two supporting seats 21. An extension direction of the guiding rails 23 is substantially parallel with the extension direction of the guiding portion 221. The guiding rails 23 are below the driving pole 22.

The cutting assembly 30 includes a moving seat 31, a connecting portion 32, and a cutter 33. The moving seat 31 defines a through hole 311, and is slidably supported on the guiding rails 23. One end of the driving pole 22 penetrates the though hole 311, and the screw portion 222 threads with the through hole 311. The fixing portion 223 connects with the moving seat 31. The fixing portion 223 is fixed on the moving seat 31 via screws (not shown). The connecting portion 32 is positioned on the moving seat 31, and one end of the connecting portion 32 protrudes from the slot 124. The cutter 33 is positioned on one end of the connecting portion 32 protruding from the slot 124, and the cutter 33 faces the second shaft hole 122.

The transmitting assembly 40 includes an operation pole 41, a transmitting pole 42, two magnetic rollers 43, and two conveying belts 44. The operation pole 41 is rotatably received in the first shaft hole 121. A first pulley 411 and a second pulley 412 are positioned on a part of the operation pole 41 penetrating below the top plate 12. The second pulley 412 is adjacent to the bottom plate 11 relative to the first pulley 411, and a diameter of the first pulley 411 is greater than a diameter of the second pulley 412. An operating handle 413 extends from an end of the operation pole 41 penetrating above the top plate 12. The transmitting pole 42 is rotatably received in the third shaft hole 123. A third pulley 421 is positioned on a part of the transmitting pole 42 penetrating below the top plate 12. A diameter of the third pulley 421 is less than the diameter of the first pulley 411. One of the conveying belts 44 is sleeved between the second pulley 412 and the third pulley 421. The two magnetic rollers 43 are respectively positioned on an end of the transmitting pole 42 penetrating below the top plate 12 and an end of the driving pole 22, which is adjacent to the transmitting pole 42. An extension direction of the magnetic roller 43 positioned on the transmitting pole 42 is substantially perpendicular to an extension direction of the magnetic roller 43 positioned on the driving pole 22. The two magnetic rollers 43 contact with each other.

In the embodiment, the magnetic rollers 43 are perpendicularly non-contact magnetic conduction components. When the magnetic roller 43 positioned on the transmitting pole 42 rotates round an extension direction of the transmitting pole 42, the magnetic roller 43 positioned on the driving pole 22 rotates round an extension direction of the driving pole 22.

The rotation pole 50 is rotatably received in the second shaft hole 122. A fourth pulley 51 is positioned on a part of the rotation pole 50 penetrating below the top plate 12. Another conveying belt 44 is sleeved between the first pulley 411 and the fourth pulley 51. One end of the rotation pole 50 penetrating above the top plate 12 is configured for supporting the lens module.

In use, one lens module is placed on the rotation pole 50, the operation pole 41 is rotated by the operating handle 413. The operation pole 41 drives the transmitting pole 42 and the rotation pole 50 to rotate via the conveying belts 44. The rotation pole 50 takes the lens module to rotate. The transmitting pole 42 drives the driving pole 22 to rotate via the magnetic rollers 43. The fixing portion 223 is moved by the driving pole 22 along the driving pole 22. The fixing portion 223 moves the moving seat 31 along the guiding rails 23. The moving seat 31 moves the cutter 33 along the slot 124. The cutter 33 cuts the lens module during process of moving along the slot 124. At least one lens received in a lens barrel can be completely disassembled after the lens barrel is cut by the cutter 33.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A device, comprising:
a bearing assembly comprising a bottom plate and a top plate opposite to the bottom plate;
a supporting assembly comprising a pair of supporting seats, a driving pole, and a pair of guide rails; the supporting seats supported by the bottom plate; the driving pole rotatably receiving between the pair of supporting seats; the guide rails supported by the bottom plate, and an extension direction of the guide rails being parallel to an extension direction of the driving pole;
a cutting assembly screwing on the driving pole and slidably supported by the guiding rails; the cutting assembly comprising a cutter protruding from the top plate;
a rotation pole rotatably positioned on the top plate, and one end of the rotation pole protruding out of the top plate and configured for supporting a lens module; and
a transmitting assembly rotatably positioned on the top plate, and connecting to the rotation pole and the driving pole; the transmitting assembly driving the rotation pole and the driving pole to rotate;
wherein when the driving pole drives the rotation pole to rotate and drives the cutting assembly to move, the cutter cuts the lens module during moving along the driving pole.

2. The device of claim 1, wherein the transmitting assembly comprises an operation pole, a transmitting pole, and a plurality of conveying belts; the operation pole is connected to the rotation pole and the transmitting pole via the conveying belts; the transmitting pole is connected to the driving pole.

3. The device of claim 2, wherein the transmitting assembly comprises two magnetic rollers, the two magnetic rollers are respectively positioned on an end of the transmitting pole and an end of the driving pole adjacent to the transmitting pole, the two magnetic rollers contact with each.

4. The device of claim 3, wherein an extension direction of the magnetic roller positioned on the transmitting pole is perpendicular to an extension direction of the magnetic roller positioned on the driving pole.

5. The device of claim 2, wherein a first pulley and a second pulley are positioned on the operation pole, a third pulley is positioned on a part of the transmitting pole, a fourth pulley is positioned on a part of the rotation pole, One of the conveying belts is sleeved between the second pulley and the third pulley, another conveying belt is sleeved between the first pulley and the fourth pulley.

6. The device of claim 2, wherein the top plate defines a first shaft hole, a second shaft hole, and a third shaft hole, all of which are arrayed along one line; the operation pole, the rotation pole, the transmitting pole are respectively rotatably received in the first shaft hole, the second shaft hole, and the third shaft hole.

7. The device of claim 6, wherein the top plate defines a slot extending along a direction parallel with an arranging direction of the first shaft hole, the second shaft hole, and the third shaft hole; the cutter protrudes out of the top plate from the slot.

8. The device of claim 1, wherein the driving pole comprises a guiding portion, a screw portion, and a fixing portion; the screw portion is sleeved on the guiding portion, adjacent to a middle of the guiding portion; the fixing portion is sleeved on the guiding portion, adjacent to an end of the guiding portion; the two ends of the guiding portion are rotatably connected between the supporting seats.

9. The device of claim 8, wherein the cutting assembly comprises a moving seat and a connecting portion; the moving seat defines a though hole, and is slidably supported by the guiding rails; one end of the driving pole penetrates the though hole, the screw portion threads with the though hole, the fixing portion connects with the moving seat.

\* \* \* \* \*